United States Patent Office 2,856,281
Patented Oct. 14, 1958

2,856,281

HIGH TEMPERATURE BRAZING ALLOYS

George D. Cremer, Lemon Grove, and Frank J. Filippi, San Diego, Calif., assignors to Solar Aircraft Company, San Diego, Calif., a corporation of California No Drawing. Application October 5, 1954
Serial No. 460,506

19 Claims. (Cl. 75—134)

This invention relates to high temperature brazing in general, and more specifically to alloys and methods of making alloys for brazing metallic joints which are subjected to service temperatures above 1000° F. The brazing materials contemplated by the invention are particularly useful for brazing such alloys as the stainless steels, the super alloys, such low alloys as Timken 17–22A and NAX steels, as well as other ferrous and non-ferrous alloys.

In brazing processes and brazed joints, three materials are involved, namely, (1) the brazing alloy or solder which is used to effect the brazed joint, (2) the basis metals united by the joint and (3) the resultant joint compositions. This nomenclature for these various materials will be adhered to throughout the following description.

In addition, three important temperatures must be considered: (1) the melting point and (2) flow point of the braze alloy used in making the joint, and (3) the useful service temperature of the resultant joint compositions. Although the latter temperature (3) may vary considerably for any specific resultant joint composition and depend in part on the service stresses encountered, the fit of the joint, and other considerations, the primary influencing factors are the physical properties and metallurgical constituency of the joint composition. These are influenced by the constituency and melting point of the braze alloy, by metallurgical treatments, by the melting point of the basis metals of the components parts, and the extent to which there is satisfactory reaction and diffusion of the basis and braze alloys.

A solid joint with satisfactory wetting or joint penetration will be obtained only when the braze alloy has been heated to the proper temperature and is in an environment which insures complete flow of the brazing alloy. However, in some prior art compositions, the flow point of the brazing alloy is too close to the melting point of the basis metals which means that in order to achieve a joint satisfactory for operation at a service temperature of, say, 1500° F., or higher the joint would have to be brazed at a temperature of approximately 2150° F. or higher, at which temperature deleterious effects to the basis metals are common.

To be useful for brazed joints subjected to the temperatures encountered, for example, in gas turbines, exhaust systems of reciprocating engines, and hot parts of jet engines, brazing alloys must have a minimum melting point of not less than 1650° F. to insure that the resultant joint compositions will resist service temperatures. However, to assure that strong useful joints may be obtained without deleterious effects to the basis metals, the maximum flow point of the brazing alloy should not be greater than approximately 2000° F., and preferably should be within 50 to 100 degrees of the melting point of the braze alloy. Further, the resultant joint compositions must have physical properties comparable to those of the basis material to assure that failure will not occur in the joint, and must be possessed of good corrosion resistance at the elevated temperature encountered so the joint will not be a point of corrosive attack.

From the foregoing, it will be understood that the optimum brazing alloy will have a flow point sufficiently low to develop a strong, solid joint without danger of deleterious effects to the basis metal, and yet will produce resultant joint compositions which will be no more subject to loss of strength or corrosion attack at service temperatures than is the basis metal.

In all prior art of our knowledge, it is essential that a controlled atmosphere of hydrogen, argon, or nitrogen be utilized during high temperature brazing. A more satisfactory braze alloy should be usable with a conventional type fluxing agent to provide a fluxing action during the brazing operation so that economical commercial production operations may be performed without a controlled atmosphere.

While certain prior art combinations of manganese and nickel have been utilized in an effort to solve some of the foregoing problems, to our knowledge, no previous brazing alloy has satisfactorily met all of the requirements recited.

We have discovered a class of brazing alloys utilizing a nickel-manganese base combined with other elements, which provide highly satisfactory brazed joints capable of long life under the service conditions described.

Therefore, a primary object of our invention is to provide a series of new and useful high temperature brazing alloys having a nickel-manganese base.

Another major object is the provision of improved nickel-manganese base brazing alloys which will develop brazed joints satisfactory for continuous service in environments up to at least 1700° F.

A further important object is the provision of novel brazing alloys which melt and flow at temperatures substantially the same as those at which the resultant joint compositions will provide satisfactory service life.

Still another object is the provision of a novel series of nickel-manganese base brazing alloys capable of developing strong joints in ferrous alloys and non-ferrous alloys substantially impervious to corrosion and oxygen attack in service temperatures up to at least 1700° F.

Another important object is the provision of a novel process for making high temperature brazing alloys which process includes the step of degassing the initial melt by addition of elements selected from the rare earth group, percentages of which elements remain in the melt and provide desirable characteristics during the brazing operation and in the resultant joint compositions.

Yet another object is the provision of improved self-flexing braze alloys containing silicon and/or boron in combination with maganese which form strong corrosion resistant joints in a relatively short time and in an air atmosphere, thus eliminating the necessity of utilizing controlled environments such, for example, as atmospheres of hydrogen, argon, nitrogen, or in vacuo, and eliminating the necessity of using a flux with a braze alloy.

A further object is provision of novel brazing alloys which form strong, corrosion resistant joints characterized by satisfactory diffusion between the braze and the basis metals but without any appreciable deleterious reaction between these metals.

Still another important object is provision of improved braze alloys which will form excellent joints with satisfactory diffusion in a very short time, thus reducing furnace time and minimizing decomposition of fluxes, oxidation of basis alloy, warpage of the work piece, and undesirable reaction of braze alloy with basis metals.

Another object is to provide novel brazing alloys capable of forming solid joints and massive brazes even in loosely fitted parts where there is a considerable gap between components to be joined.

Still another object is provision of improved high temperature brazing alloys ideally suited for joining foil-thin sheet metal components.

Another important object is provision of means and method of achieving satisfactory braze joints in an air atmosphere.

Still another object is provision of novel brazing alloys capable of joining metals dissimilar in chemistry and physical dimensions.

Yet another object is provision of improved braze alloys characterized by unique and highly beneficial self-fluxing properties.

These and other objects and advantages of our invention will become apparent from the following description and subjoined claims.

In its broadest aspects our invention contemplates brazing alloys having a nickel and manganese base which comprises about 79.9 to 99 percent by weight of the whole alloy. It has been found that, while nickel is an essential ingredient, amounting to a minimum of 35% of alloys found satisfactory, this minimum can be drastically reduced by the substitution of cobalt for up to 90% of the nickel in any given alloy. It will be noted, however, that we believe a certain minimum quantity of nickel must be retained, that is, complete replacement with cobalt is not satisfactory.

While the alloy base of nickel and manganese is common to all alloys we have discovered, the balance varies considerably both in amount and constituency, depending on the use, and particular requirement of any specific alloy. Some of our preferred alloys are relatively simple ternary systems, whereas others are more complex, containing 4 or more ingredients.

Following is a tabulation of the elemental substances utilized in our alloys and the approximate ranges of proportions in which each material may be used. It will be understood that all materials in this tabulations are not required in any given alloy.

TABLE I

| Element | Percent by Weight | |
|---|---|---|
| | Minimum | Maximum |
| Nickel (Ni) | 35 | 91. |
| Manganese (Mn) | 0.5 | 60. |
| Cobalt (Co) | 0 | Replace up to 90% of Nickel. |
| Silicon (Si) | 0 | 8.0. |
| Boron (B) | 0 | 3.0. |
| Chromium (Cr) | 0 | 10.0. |
| Iron (Fe) | 0 | 20.0. |
| Tungsten (W) | 0 | 3.0. |
| Molybdenum (Mo) | 0 | 5.0. |
| Titanium (Ti) | 0 | 5.0. |
| Columbium (Cb) | 0 | 5.0. |
| Carbon (C) | 0 | 1.0. |
| Germanium (Ge) | 0 | 10.0. |
| Copper (Cu) | 0 | 10.0. |
| Aluminum (Al) | 0 | 2.0. |
| Rare Earth Metals | 0 | 0.5. |

In regard to the foregoing tabulation, it is pointed out that the ranges of proportions given apply to ingredients added to the melt rather than those found in the finished alloy. A portion of some of the added ingredients may be lost during the melt. For example, the rare earth metals are included in many alloys formulated according to our invention as hereinafter explained. While traces of these metals remain in and have a beneficial effect on the properties of the alloy, as also hereinafter explained, it has been impossible to obtain an exact measurement of the remaining traces.

Before describing specific examples of the novel type of alloy contemplated by the invention, the part that we believe each of the elements in the foregoing tabulation plays when incorporated in such alloys will be explained.

We have discovered that six factors must be considered to provide a useful braze alloy of the type contemplated by our invention. These are (1) a reasonably low melting point, (2) fine grain structure, (3) good flow and melt properties, (4) self-fluxing properties, (5) braze alloy corrosion resistance, and (6) high temperature strength as will as toughness at lower temperatures. It will be understood that the various elements must combine satisfactorily and should not have a deleterious effect on each other or on the basis metals.

According to our invention and as shown in the above tabulation, nickel is one of the main constituents of our braze alloys. Nickel is employed because of its desirable high temperature chemical and physical properties and its compatibility with a wide variety of alloying elements. Cobalt, which may be substituted for a large portion of the nickel in any specific formulation, displays many of the desirable attributes of nickel in our alloys. While its specific action in combination with nickel has not been definitely ascertained, as a solid solution agent, we believe it provides increased solubility while increasing matrix strength.

Manganese, another ingredient common to all our alloys, functions primarily to lower the melting point. As pointed out hereinabove, it may be desirable to vary the melting point over a temperature range of from approximately 1650 to 2250° F., depending on the particular brazing problem involved.

As previously mentioned simple binary combinations of nickel and manganese, when used for high temperature brazing, suffer from a number of undesirable characteristics. As shown in the manganese-nickel phase diagram in the Metals Handbook, 1948 edition, ASTM, page 1228, a straight 40% nickel, 60% manganese compound has a minimum melting point of approximately 1830° F. and any deviation in either direction will raise the melting point. For example, a 65 nickel, 35 manganese compound, which is generally believed best for developing an optimum joint, melts at about 2250° F. Therefore, according to our invention certain other elements selected from the foregoing tabulation are added, singly or in various combinations, to modify the basic binary system and obtain alloys having the desired properties. Among other things, these additions lower the melting point of a substantially 65–35 compound down to about 1850° F. as shown by Examples 2, 4, 7 and 8 below. These more complex alloys not only overcome the objectionable features and limitations of prior art nickel-manganese alloys but also exhibit other highly desirable characteristics.

Additions of silicon and boron, effect a lowering of the melting point. For example with our silicon and/or boron additives according to the examples below, we lower the melt and flow point of an approximately 40–60 nickel-manganese compound to 1760° F. (Example 3), and that of the 65–35 compound to the acceptable 1850° F. point (Examples 2 and 4). Silicon and boron also provide important self-fluxing action by the braze alloy during the actual brazing operation and in the disclosed examples enhance flow properties through a lowering of the melt and flow points. These elements also contribute to development of excellent high temperature strength and oxidation resistance in the resultant joint composition. Both boron and silicon also are deoxidizing agents and provide grain refinement to the brazing alloy which results in further strength and resistance to corrosion.

Iron has proven of benefit. While the primary function of the iron is that it appears to promote flow of the molten alloy, we find that it also tends to make a sounder and tougher joint.

Chromium is particularly advantageous in enhancing the resistance to oxygen attack in the joint under conditions of high service temperatures, and lends a high degree of strength to the finished joint. We have determined the optimum amounts consistent with maintaining useful brazing alloy flow temperatures.

Tungsten adds great strength to the matrix and improves resistance to corrosive attack.

Molybdenum may combine with carbon to form complex carbides which enhance the strength of the finished joint and materially control rapid grain growth. Both molybdenum and tungsten alloying additions greatly stiffen the solid solution matrix against deformation under elevated temperature stressing. Carbon is included with the generally accepted impurities and minor constituents of the alloying elements. We find carbon tends to lower the melting point. We prefer, however, to keep the carbon content to a minimum.

Titanium and columbium appear to be desirable where excess carbon is encountered, as these elements form carbides which may provide added high temperature strength without deleterious effects. Titanium and columbium in solid solution enhance the corrosion resistance of the matrix alloy.

Germanium is included specifically for its ability to lower the melting point of the brazing alloy. Our alloys containing germanium have a beneficial toughening effect on the resultant joint composition. Metallographic examinations of germanium bearing alloys show an added, well-distributed, nodular phase.

Aluminum aids in grain refinement and provides added resistance to oxidation. However, the amount of aluminum used must be carefully controlled because the brazing operation becomes progressively more difficult as the aluminum content is increased.

Copper promotes wetting and therefore substantially improves the flow of the molten brazing alloy. Both melting and flow temperatures are reduced with additions of copper up to at least 10%. Copper also adds to chemical corrosion resistance.

The rare earth metals play an important part both in the finished alloy and their initial preparation. In preparing our alloys, a very beneficial degassing occurs upon addition of rare earth compounds, and also during remelting of the brazing alloy. The rare earth metal traces remaining in the brazing alloys enhance oxidation resistance, aid in grain refinement, increase the fluidity of the molten braze material during brazing and add to the ductility of the resultant joint alloy.

The manner in which the various elements are combined is important if superior braze alloys are to be obtained. Although we prefer the procedure which now will be described, it should be understood that variations are possible and other procedures may be equally satisfactory.

Nickel metal of any convenient size, preferably in small pieces, is roasted at approximately 1700° F. for about one hour to drive off occluded hydrogen. Electrolytic nickel has been found satisfactory. The roasted nickel is introduced into the furnace in alternate layers with flake manganese and the furnace charge heated to an approximate temperature of 2000–2300° F. When cobalt replaces part of the nickel, it may be added to the remaining nickel, prior to the roasting process. Preferably, the cobalt should be of a size similar to that of the remaining nickel. We have discovered that improved alloys result if a small amount of a flux such as cryolite (sodium aluminum fluoride 3NaF·AlF$_3$) is added to the melt, approximately one pound to a 50-pound melt, to reduce oxide formation and protect the alloy.

Silicon, in elemental form or in the form of nickel-silicon, is then added and the batch held at temperature until a homogeneous melt is obtained, in general approximately 30 minutes for a 500-pound melt. Iron and columbium are added in elemental form or as ferro-columbium and a further soaking time of approximately 10 minutes is allowed. Boron in elemental form or in the form of nickel-boron is added and, following a five minute soak, the rare earth constituents either as oxides or misch-metal are added. When rare earth metal oxide powders are used, they may be compacted into briquets and immersed in the melt. The rare earths promote an immediate release of occluded gases from the melt, with the degassing process complete in from 30 seconds to one minute, and the melt may then either be atomized or poured into ingot molds. We prefer to pour ingots because a further degassing is effected as the alloy cools through the solidus state.

If the particular alloy being formulated contains chromium, it is preferably added in the form of ferro-chromium or scrap of high chromium content; where tungsten and/or molybdenum is used, it is preferably added in the form of high alloy scrap; titanium as nickel-titanium; copper as "pure" copper or Monel (about 28% copper); germanium as "pure" germanium; aluminum as the "pure" metal or high alloy scrap; and carbon in the form of charcoal. According to the "Handbook of Material Trade Names" by Zimmerman and Lavine, 1953 edition, published by Industrial Research Service, "Monel" is a line of high nickel-copper, corrosion-resistant alloys available in wrought or cast forms in various types as amplified on page 374 thereof. Usually there is no necessity of added carbon as a separate ingredient as this element is usually present as an impurity in other ingredients in sufficient quantities to satisfy the requirements of our novel alloys.

Generally, the chromium, tungsten and molybdenum may be added at any time; the copper and aluminum should be added during the melting process; and the titanium and germanium after the batch is completely molten. The time of addition is important, being dictated by the oxidation characteristics of the element. Accordingly, titanium and germanium which, as elements, are easily attached by oxygen, are introduced into the melt at a late stage.

It will be understood that the reason many of the ingredients are used in the form of compounds or alloys is because of their greater availability and/or lower cost than in the "pure" state. Furthermore, even chemically "pure" materials are frequently no better than 98% pure. It is also pointed out that any ingredient may be added in uncombined form where desired or, particularly, where necessary to balance the constituency of the alloy. Thus, for example, where columbium is added as ferro-columbium and/or chromium as ferro-chromium it may be necessary to add additional iron, chromium and/or columbium combined in some other alloys or in pure form to achieve the proportions desired in the completed alloy and/or to make up for any losses occurring during the melt.

A great number of highly satisfactory and superior brazing alloys have been developed according to the present invention using the elements and ranges enumerated in Table I. The following specific examples, representing the chemical analysis of the completed alloys, should be considered entirely descriptive and in no way limiting:

*Example 1*

(Flow point 1830° F.)

| Ingredient: | Percent by weight |
| --- | --- |
| Ni | 38.8 |
| Mn | 58.3 |
| Si | 2.9 |

*Example 2*

(Flow point 1870° F.)

| Ingredient: | Percent by weight |
| --- | --- |
| Ni | 65.5 |
| Mn | 29.5 |
| Si | 1.0 |
| B | 3.0 |
| Ge | 1.0 |

Example 3

(Flow point 1760° F.)

| Ingredient: | Percent by weight |
|---|---|
| Ni | 41.2 |
| Mn | 56.5 |
| Si | 1.0 |
| B | 0.75 |
| C | 0.05 |
| Cb | 0.5 |

Example 4

(Flow point 1850° F.)

| Ingredient: | Percent by weight |
|---|---|
| Ni | 65.5 |
| Mn | 31.3 |
| Si | 2.0 |
| B | 1.0 |
| Fe | 0.5 |
| Cr | 0.5 |
| C | 0.05 |

Example 5

(Flow point 1950° F.)

| Ingredient: | Percent by weight |
|---|---|
| Ni | 68.5 |
| Mn | 13.7 |
| Si | 4.6 |
| B | 1.3 |
| Fe | 1.3 |
| Cr | 10.0 |
| C | 0.063 |

Example 6

(Flow point 1950° F.)

| Ingredient: | Percent by weight |
|---|---|
| Ni | 35.0 |
| Mn | 50.3 |
| Si | 1.2 |
| Fe | 0.3 |
| Cr | 3.3 |
| Co | 8.4 |
| W | 2.5 |

Example 7

(Flow point 1950° F.)

| Ingredient: | Percent by weight |
|---|---|
| Ni | 67.2 |
| Mn | 29.0 |
| Si | 1.67 |
| B | 0.39 |
| Fe | 1.3 |
| C | 0.04 |
| Cb | 0.4 |

Example 8

(Flow point 1860° F.)

| Ingredient: | Percent by weight |
|---|---|
| Ni | 62.2 |
| Mn | 29.7 |
| Si | 1.8 |
| B | 0.9 |
| Fe | 0.4 |
| C | 0.05 |
| Cu | 5.0 |

Example 9

(Flow point 1830° F.)

| Ingredient: | Percent by weight |
|---|---|
| Ni | 47.3 |
| Mn | 47.1 |
| Si | 1.1 |
| B | 0.3 |
| Fe | 2.7 |
| Cr | 0.7 |
| Mo | 0.2 |
| Ti | 0.75 |

Example 10

(Flow point 1850° F.)

| Ingredient: | Percent by weight |
|---|---|
| Ni | 59.7 |
| Mn | 20.2 |
| Si | 3.4 |
| B | 1.0 |
| Fe | 1.2 |
| Cr | 3.5 |
| C | 0.05 |
| Co | 8.0 |
| W | 2.6 |

Example 11

(Flow point 1810° F.)

| Ingredient: | Percent by weight |
|---|---|
| Ni | 89.0 |
| Mn | 2.5 |
| Si | 6.2 |
| B | 2.0 |

Example 12

(Flow point 1850° F.)

| Ingredient: | Percent by weight |
|---|---|
| Ni | 91.0 |
| Mn | 1.0 |
| Si | 6.0 |
| B | 2.0 |

Example 13

(Flow point 1930° F.)

| Ingredient: | Percent by weight |
|---|---|
| Ni | 91.0 |
| Mn | 4.0 |
| Si | 3.0 |
| B | 2.0 |

Of course, it will be understood that in any of our alloys traces of carbon and other elements as impurities may be found, but these traces will be in amounts which apparently have no appreciable effect on either the brazing operation or the resultant joint compositions. Also it will be understood that the rare earths may be beneficially utilized in any of the examples and our other alloys.

As previously mentioned, the proportions given in the foregoing examples, are those in the completed alloys, determined by chemical analysis. It will be noted that in certain instances, the percentage weight composition of the examples total less or more than 100% for a reason which will now be explained.

When the ingredients are measured for a given formula, the total naturally is always 100%. However, due to losses and impurities (even chemically "pure" material may be no better than 98% pure) and because analysis is not made for all possible elements, certain of the exemplary alloys disclosed contain small quantities of unspecified impurities which do not affect the quality or function of the alloys. For example, nickel-boron is approximately 85% nickel, 14% boron with a balance of silicon, carbon, aluminum, iron, etc., as impurities;

nickel-silicon is about 92.5% nickel and 5.6% silicon with the balance comprised of iron, carbon, copper, sulfur, phosphorus, etc. Even electrolytic nickel and manganese are only 99.9% pure with cobalt, iron or copper impurities. Silicon usually contains up to 2% impurities of aluminum and chromium, while nominally pure chromium may contain as much as 1.5% in the aggregate of aluminum, silicon, iron, phosphorus, sulfur, etc.

As for the exemplary compounds in which the total percentage composition exceeds 100%, this is due to inevitable inaccuracies inherent in the chemical analyses.

It has been found that in many cases it is possible to further improve our brazing alloys by adding basis alloy or other metal or alloy to the brazing alloy. For example, if the specific brazing alloy will be used in brazing Inconel parts, we may add powdered Inconel, in amounts up to 20 percent of the weight of the braze elements, to the braze alloy, or we may add other metals and/or alloys which have a melting point above that of the braze alloy. According to the "Handbook of Material Trade Names" by Zimmerman and Lavine, 1953 edition, "Inconel" is a high nickel-chromium iron alloy furnished in wrought or cast forms as further identified therein on page 293 thereof. This may be accomplished in various ways, for example (1) by addition when the initial melt is made, (2) by a mechanical mixture of the powdered basis metal with the atomized braze powder, in which case a slightly finer grain size of basis alloy is desirable.

Although we prefer to use our brazing alloys in powder form with a grain size of approximately 100 mesh, highly successful brazes have been obtained by utilizing our alloys as shims, rods, and all sizes of granules from shot through −325 mesh.

To make superior brazes with any of our alloys, a maximum brazing temperature of only 2050° F. is required, and the braze will be achieved in practically every case within 30 seconds after the work piece has reached temperature. In many instances where the work piece is of thin gauge material, the part need be taken only 20 to 50 degrees over the flow point of the braze alloy for 30 seconds to complete the braze operation.

From the foregoing, it will be appreciated that we have developed a series of high temperature brazing alloys with which sound, strong, corrosion resistant brazed joints may be made at compatible temperatures and in a time cycle substantially shorter than that required by prior art. Furthermore, the fact that many of our new alloys flow well at temperatures close to their melting points permits sound brazed joints to be made with no deleterious alloying with the basis metals being found.

Although the present invention has been described in conjunction with preferred embodiments, it is to be understood that modifications and variations may be resorted to without departing from the spirit and scope of the invention, as will be readily apparent to those skilled in the art. Such modifications and variations are considered to be within the purview and scope of the invention as defined by the appended claims.

What we claim and desire to protect by United States Letters Patent is:

1. A metal alloy consisting by weight of: about 35 to 89% nickel in the absence of cobalt therefrom; about 0.5 to 60% manganese; cobalt as an optional ingredient for replacing up to about 90% by weight of the nickel; and at least one material from the group consisting of silicon and boron, with silicon in the range of about 1 to 8%, and boron in the range of about 0.3 to 3% when included; the total of the nickel, manganese, and cobalt when used, equalling at least 79.9% by weight of the alloy.

2. A metal alloy as defined in claim 1, further including as the balance of said alloy at least one other element selected from the following in quantities up to the maximum limits stated for each: chromium, 10%; iron, 19.1%; tungsten, 2%; molybdenum, 5%; titanium, 5%; columbium, 5%; carbon, 1%; germanium, 10%; copper, 10%; aluminum, 2%; and rare earths, 0.5%.

3. A high temperature brazing alloy for brazing a preselected basis alloy comprising a metal alloy as defined in claim 1 having added thereto up to 20 percent of its weight of said basis alloy.

4. A metal alloy comprising by weight: approximately 35 to 68.5% nickel in the absence of cobalt therefrom; approximately 13.7 to 56.5% manganese; cobalt as an optional ingredient for replacing up to 90% by weight of the nickel; and at least one material from the group consisting of silicon and boron, with silicon in the range of approximately 1 to 8%, and boron in a range of approximately 0.3 to 3% when included; the total of the nickel, manganese, and cobalt when used, equaling at least 79.9% by weight of the alloy.

5. A brazing alloy in discrete particle form having a flow point not in excess of approximately 1950° F. consisting by weight of: approximately 35 to 91% nickel in the absence of cobalt therefrom; approximately 0.5 to 60% manganese; cobalt as an optional ingredient for replacing up to 90% by weight of the nickel; and at least one material from the group consisting of silicon and boron, with silicon in the range of approximately 1 to 8%, and boron in the range of approximately 0.3 to 3% when included; the total of the nickel, manganese, and cobalt when used, equalling at least 79.9% by weight of the alloy.

6. A brazing alloy consisting by weight of: approximately 35 to 91% nickel in the absence of cobalt therefrom; approximately 0.5 to 60% manganese; cobalt as an optional ingredient for replacing up to 90% by weight of the nickel; silicon in the range of approximately 1 to 8%; and boron in a range of approximately 0.3 to 3%; the total of the nickel, manganese, and cobalt when used, equalling at least 79.9% by weight of the alloy; all of said recited ingredients totaling at least 88.1% by weight of the whole alloy.

7. An alloy consisting by weight essentially of nickel, manganese and silicon totalling at least 97% by weight, with the nickel being present in quantities between 35 to 89%, the manganese being present in quantities between 0.5% and 60%, and the silicon being present in quantities between 1% and 8%.

8. An alloy as defined in claim 7 further including boron in quantities ranging from 0.3% to 3% by weight.

9. An alloy consisting by weight essentially of approximately 41.2 percent nickel, approximately 56.5 percent manganese, approximately 1.0 percent silicon, approximately 0.75 percent boron, approximately 0.05 percent carbon and approximately 0.5 percent columbium.

10. An alloy consisting by weight, essentially of approximately 65.5 percent nickel, approximately 31.3 percent manganese, approximately 2.01 percent silicon, approximately 1.0 percent boron, approximately 0.5 percent iron, approximately 0.5 percent chromium, and approximately 0.05 percent carbon.

11. An alloy consisting by weight, essentially of approximately 68.5 percent nickel, approximately 13.7 percent manganese, approximately 4.6 percent silicon, approximately 1.3 percent boron, approximately 1.3 percent iron, approximately 10 percent chromium and approximately 0.063 percent carbon.

12. An alloy consisting by weight essentially of approximately 67.2% nickel, approximately 29.0% manganese, approximately 1.67% silicon, approximately 0.39% boron, approximately 1.3% iron, approximately 0.04% carbon and approximately 0.4% columbium.

13. An alloy consisting by weight essentially of approximately 91% nickel, approximately 4% manganese, approximately 3% silicon and approximately 2% boron.

14. A method of making high temperature braze alloys containing nickel and manganese, comprising roasting the nickel at high temperature to drive off occluded gases, preparing a batch made up of the roasted nickel and manganese, heating the batch to a temperature of about 2000 to 2300° F. until a homogeneous melt is obtained, and adding rare earth metal content shortly before pouring the metal.

15. A method of making high temperature braze alloys containing nickel, manganese, and at least one other elemental substance, comprising roasting the nickel at high temperature to drive off occluded gases, preparing a batch made up of alternate layers of the roasted nickel and flake manganese, heating the batch to a temperature of about 2000 to 2300° F. until a homogeneous melt is obtained, adding thereafter at predetermined time intervals said other elemental substances.

16. The method defined in claim 15 including the step of adding a small amount of flux to the batch.

17. A method of making high temperature braze alloys containing nickel, manganese, and at least one other element selected from the group consisting of silicon, iron, columbium and boron comprising roasting the nickel at approximately 1700° F. for about one hour to drive off occluded hydrogen, preparing a batch comprised of alternate layers of roasted nickel and flake manganese, heating said batch to a temperature of about 2000 to 2300° F., until a homogeneous melt is obtained, and adding thereafter the elements selected from said group in the order named at predetermined intervals of time.

18. A method of making high temperature braze alloys containing nickel, manganese, silicon, iron, columbium, boron, and at least one of the rare earth metals comprising roasting the nickel in small pieces at a temperature of about 1700° F. for about one hour, preparing a batch of the roasted nickel and flake manganese arranged in alternate layers, adding a small amount of flux to the batch, heating the batch to a temperature of about 2000 to 2300° F., adding the silicon, holding the batch at temperature until a homogeneous melt is obtained, adding iron and columbium, allowing a soaking time of about 10 minutes, adding the boron, allowing another soaking period of about 5 minutes, and then adding the rare earth metal ingredient.

19. A method of making high temperature braze alloys of predetermined constituency containing nickel, manganese, and at least one other elemental substance selected from the group consisting of aluminum, boron, chromium, cobalt, columbium, copper, germanium, iron, molybdenum, silicon, titanium, tungsten, and at least one rare earth metal, comprising: roasting the nickel at high temperature to drive off occluded gases; preparing a batch made up of alternate layers of the roasted nickel and flake manganese; heating the batch to a temperature of about 2000 to 2300° F., adding to the batch during the melting period any ingredient from the group consisting of silicon, copper and aluminum which is required by said predetermined constituency; holding the batch at temperature until a homogeneous melt is obtained; adding to the batch when molten any ingredient from the group consisting of titanium, germanium, boron, columbium and iron, which is required by said predetermined constituency; adding to the batch at any time, any ingredient from the group consisting of chromium, tungsten, cobalt and molybdenum which is required by said predetermined constituency; and finally adding the rare earth metal content if required by said predetermined constituency, shortly before pouring the melt.

References Cited in the file of this patent

UNITED STATES PATENTS

| 1,529,277 | Rohde | Mar. 10, 1925 |
|---|---|---|
| 1,660,246 | Wille | Feb. 21, 1928 |
| 2,133,291 | Gordon | Oct. 18, 1938 |
| 2,162,252 | Grossman | June 13, 1939 |
| 2,220,961 | Kern | Nov. 12, 1940 |
| 2,237,184 | Lemmers | Apr. 1, 1941 |
| 2,242,865 | Kihlgren | May 20, 1941 |
| 2,743,177 | Cape | Apr. 24, 1956 |

FOREIGN PATENTS

| 302,394 | Great Britain | Dec. 17, 1928 |
|---|---|---|
| 540,039 | Great Britain | Oct. 2, 1941 |
| 264,972 | Switzerland | Feb. 16, 1950 |
| 61,624 | Norway | Oct. 23, 1939 |

UNITED STATES PATENT OFFICE
CERTIFICATE OF CORRECTION

Patent No. 2,856,281                                          October 14, 1958

George D. Cremer et al.

It is hereby certified that error appears in the printed specification of the above numbered patent requiring correction and that the said Letters Patent should read as corrected below.

Column 2, line 52, for "maganese" read -- manganese --; column 4, line 5, for "will" read -- well --; line 31, for "ASTM" read -- ASM --; column 10, line 16, for "equaling" read -- equalling --.

Signed and sealed this 10th day of February 1959.

(SEAL)
Attest:

KARL H. AXLINE
Attesting Officer

ROBERT C. WATSON
Commissioner of Patents